(12) United States Patent
Chen et al.

(10) Patent No.: US 11,138,352 B2
(45) Date of Patent: Oct. 5, 2021

(54) ADDITIVE MANUFACTURING INCLUDING COMPENSATION MODELING METHODOLOGY WITH SHAPE TRANSFORMATION

(71) Applicant: Hamilton Sundstrand Corporation, Charlotte, NC (US)

(72) Inventors: Yanzhi Chen, Shanghai (CN); Qingqing Zhang, Shanghai (CN); Tahany Ibrahim El-Wardany, Vernon, CT (US); Ranadip Acharya, Rocky Hill, CT (US); Colette Opsahl Fennessy, West Hartford, CT (US); William K. Tredway, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 155 days.

(21) Appl. No.: 16/432,051

(22) Filed: Jun. 5, 2019

(65) Prior Publication Data
US 2019/0377843 A1    Dec. 12, 2019

(30) Foreign Application Priority Data
Jun. 6, 2018    (CN) .......................... 201810578857.X (51) Int. Cl.
*G06F 30/23*    (2020.01)
*B29C 64/393*    (2017.01)
(Continued)

(52) U.S. Cl.
CPC ............ *G06F 30/23* (2020.01); *B29C 64/393* (2017.08); *G06T 17/20* (2013.01); *B33Y 50/02* (2014.12);
(Continued)

(58) Field of Classification Search
None
See application file for complete search history.

(56) References Cited

U.S. PATENT DOCUMENTS 9,827,717 B2    11/2017    Huang et al.
9,844,917 B2    12/2017    Burhop et al.
(Continued)

FOREIGN PATENT DOCUMENTS

CN    103970952 A    8/2014
CN    107512002 A    12/2017
(Continued)

OTHER PUBLICATIONS

Liu et al., "WireFab: Mix-Dimensional Modeling and Fabrication for 3D Mesh Models" Proceedings of the May 6-11, 2017 CHI Conference on Human Factors in Computing Systems. ACM (pp. 965-976).

(Continued)

*Primary Examiner* — Nathan L Laughlin
(74) *Attorney, Agent, or Firm* — Cantor Colburn LLP (57) ABSTRACT

An additive manufacturing (AM) system includes a process distortion compensation computing system and an AM peripheral device. The process distortion compensation computing system determines a digital nominal model that represents a physical target object excluding a distortion, and a digital distortion model that represents the physical target object including at least one distortion. The AM peripheral device forms a three-dimensional (3D) physical object based on a digital compensation model. The process distortion compensation computing system also determines a digital skeletal model indicating a predicted change in at least one of the shape and volume of the nominal model, and (Continued)

generates the digital compensation model based on the skeletal model that compensates for the at least one distortion.

9 Claims, 8 Drawing Sheets

(51) Int. Cl.
*G06T 17/20* (2006.01)
*B33Y 50/02* (2015.01)
*G06F 119/18* (2020.01)

(52) U.S. Cl.
CPC ...... *G06F 2119/18* (2020.01); *G06T 2210/44* (2013.01); *G06T 2210/56* (2013.01)

(56) References Cited

U.S. PATENT DOCUMENTS

| | | | |
|---|---|---|---|
| 9,886,526 B2 | 2/2018 | Huang | |
| 9,925,725 B2 | 3/2018 | Batchelder | |
| 2008/0199060 A1* | 8/2008 | Boyden | G06T 5/006 382/131 |
| 2015/0352794 A1* | 12/2015 | Nguyen | B22F 3/1055 700/98 |
| 2015/0362898 A1 | 12/2015 | Potter | |
| 2016/0320771 A1 | 11/2016 | Huang | |
| 2016/0342149 A1 | 11/2016 | Napadensky | |
| 2017/0014903 A1 | 1/2017 | Sugiura | |
| 2017/0032561 A1 | 2/2017 | Choi et al. | |
| 2017/0165918 A1 | 6/2017 | Yuji et al. | |
| 2017/0173870 A1 | 6/2017 | Condello et al. | |
| 2017/0190110 A1 | 7/2017 | Fortunata | |
| 2017/0190124 A1 | 7/2017 | Douilly et al. | |
| 2017/0220031 A1 | 8/2017 | Morovic, Jr. et al. | |
| 2017/0259396 A1 | 9/2017 | Yamamura et al. | |
| 2017/0297323 A1 | 10/2017 | Yamazaki et al. | |
| 2017/0368753 A1 | 12/2017 | Yang et al. | |
| 2018/0011475 A1 | 1/2018 | Donovan et al. | |
| 2018/0053346 A1 | 2/2018 | Grbic et al. | |
| 2018/0071868 A1 | 3/2018 | Goehler et al. | |
| 2018/0071986 A1 | 3/2018 | Buller et al. | |
| 2018/0071988 A1 | 3/2018 | Emamjomeh et al. | |
| 2018/0093419 A1 | 4/2018 | Lappas et al. | |
| 2018/0339447 A1* | 11/2018 | Redfield | B29C 64/112 |
| 2018/0365342 A1* | 12/2018 | Allen | B33Y 50/00 |
| 2019/0278255 A1* | 9/2019 | de Pena | B29C 64/00 |

FOREIGN PATENT DOCUMENTS

| | | |
|---|---|---|
| DE | 102015207216 A1 | 12/2016 |
| EP | 3061546 A1 | 8/2016 |

OTHER PUBLICATIONS

Extended European Search Report for European Application No. 19178881.9; Application Filing Date Jun. 6, 2019; dated Nov. 6, 2019 (10 pages).

Yoshizawa et al., "Skeleton-based variational mesh deformations" Computer Graphics Forum. vol. 26. No. 3. Oxford, UK: Blackwell Publishing Ltd, 2007 (pp. 255-264).

Autodesk Inc., Netfabb 2018, "Tutorial 12: To Export a Compensated Geometry", <URL: http://help.autodesk.com/view/NETF/2018/ENU/?guid=GUID-DB71FB6D-60F3-4093-9033-D7D0E3A3CF63> Accessed May 29, 2019 (5 pages).

Geonx, <URL: http://www.geonx.com/index-3.html> Accessed May 29, 2019 (5 pages).

* cited by examiner

ADDITIVE MANUFACTURING INCLUDING COMPENSATION MODELING METHODOLOGY WITH SHAPE TRANSFORMATION

CROSS-REFERENCE TO RELATED APPLICATIONS

This application claims the benefit of Chinese Application No. 201810578857.X filed Jun. 6, 2018, which is incorporated herein by reference in its entirety.

BACKGROUND

The disclosure relates generally to product manufacturing, and more particularly, to additive manufacturing processes.

Additive manufacturing includes building two-dimensional layers (or slices), on a layer by layer basis to manufacture three-dimensional components. For laser powder bed diffusion and laser directed energy deposition processes Each layer is generally very thin (for example between 20 to 100 microns) and many layers are formed in a sequence with the two-dimensional (2D) shape varying on each layer to provide the desired final three-dimensional (3D) profile. On the other hand wire based additive manufacturing processes can deposit layers with mm height. In contrast to traditional "subtractive" manufacturing processes where material is removed to form a desired component profile, additive manufacturing processes progressively add material to form a net shape or near net shape final component.

Depending on process parameters and additive manufacturing process types, additively manufactured components demonstrate significant amount of distortion and residual stress. To obtain shape accuracy, various techniques are employed to compensate for the dimensional change during the part design step. The current process of distortion compensation relies on an expensive iterative approach which subtracts the computed distortion in each step to reach a final shape that upon distortion yields accurate shape. Current methods obtain the compensated geometry only from the spatial layout gap between the nominal and distorted models.

BRIEF DESCRIPTION

According to a non-limiting embodiment, an additive manufacturing (AM) system comprises a process distortion compensation computing system configured to determine a digital nominal model that represents a physical target object excluding a distortion, and a digital distortion model that represents the physical target object including at least one distortion. An AM peripheral device is configured to form a three-dimensional (3D) physical object based on a digital compensation model. The process distortion compensation computing system determines a digital skeletal model indicating a predicted change in at least one of the shape and volume of the nominal model, and generates the digital compensation model based on the skeletal model that compensates for the at least one distortion.

According to another non-limiting embodiment, a method of fabricating a physical three-dimensional (3D) product using an additive manufacturing (AM) system comprises determining, via a process distortion compensation computing system, a digital nominal model that represents a physical target object excluding a distortion, and digitally representing, via a digital distortion model, the physical target object including at least one distortion. The method further comprises determining, via the process distortion compensation computing system, a digital skeletal model indicating a predicted change in at least one of the shape and volume of the nominal model. The method further comprises generating, via the process distortion compensation computing system, a digital compensation model based on the skeletal model that compensates for the at least one distortion, and forming, via an AM peripheral device, a three-dimensional (3D) physical object based on the digital compensation model.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

AM parts are susceptible to "springback" during the fabrication process. For instance, the part can realize compression and/or expansion states (e.g., bending) during fabrication. This springback phenomenon is typically caused by the part' inherent desire to return to its nominal profile following removal of the compression and/or expansion force. The resulting springback, however, causes distortion of the part along with residual stresses on one or more regions and/or connection points of the part.

In addition, AM parts are susceptible to distortions during the cooling phase of the AM fabrication process thereby reducing product's precision and/or quality. Current methods that obtain a compensated geometry only from the spatial layout gap between the nominal and distorted models ignore the physical process during material shrinkage of an AM fabricated product which can occur during the cooling phase of the AM manufacturing process. Commercial software packages are available which predict residual stress and distortion of an AM product. However, the commercial software packages available to date do not take into account the physics realized by the product during the various stages of the product during AM fabrication, and also lack practical solutions for complex parts of larger size.

Figure 1:
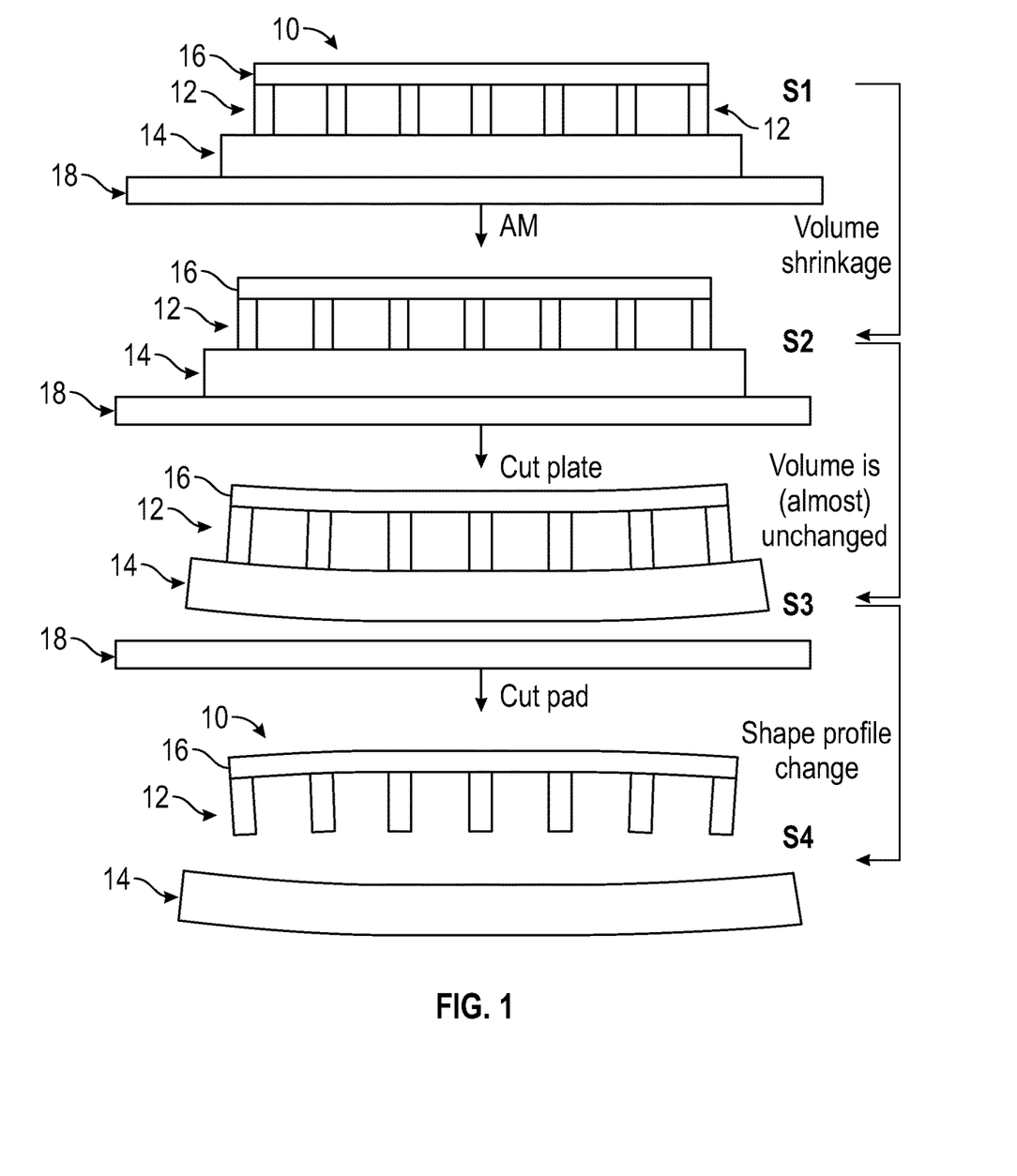
FIG. 1 illustrates a AM product undergoing springback during an AM fabrication process.

With reference to FIG. 1, an AM product 10 is illustrated undergoing springback during an AM fabrication process. The AM product 10 is designed with a bridge-like profile to match a target AM product, but products with different shapes and/or profiles can be fabricated. In this example, the AM product 10 is fabricated by forming a plurality of individual supports 12 on a sacrificial pad 14. A bridge top 16 is then formed on the upper surface of the supports 12. The sacrificial pad 14 is formed on a fabrication plate or stage 18, which supports the sacrificial pad 14 during fabrication.

Still referring to FIG. 1, the AM product 10 including the bridge top 16 and supports 14 is illustrated at an intermediate stage (S1). At this intermediate stage (S1), the AM product exists at a nominal profile and shape. During fabrication, the AM part 10 realizes a compression force at a second stage (S2). The compression force can be caused by shrinkage of one or more portions of the AM product 10. Because the AM product 10 is coupled to the pad 14 and plate 18 while the AM product 10 shrinks, the compression force is applied to the AM product 10. At a third stage (S3), the sacrificial pad 14 is removed from the AM plate 18, which causes the AM product 10 to "spring" inward or "concave". At a fourth stage (S4), the sacrificial pad 14 is removed from the supports 12 to obtain the final AM product 10. As a result, the loaded compression force is released and the AM product 10 experiences a second springback (i.e., expands) as it attempts to return to its nominal profile and shape. However, the compression and expansion stages can permanently distort the AM product material, thereby producing an AM product with dimensions and/or a prolife that does not match the target AM product 10. In the example illustrated in FIG. 1, the final AM product 10 is produced with an undesirable convex shape.

Figure 2:
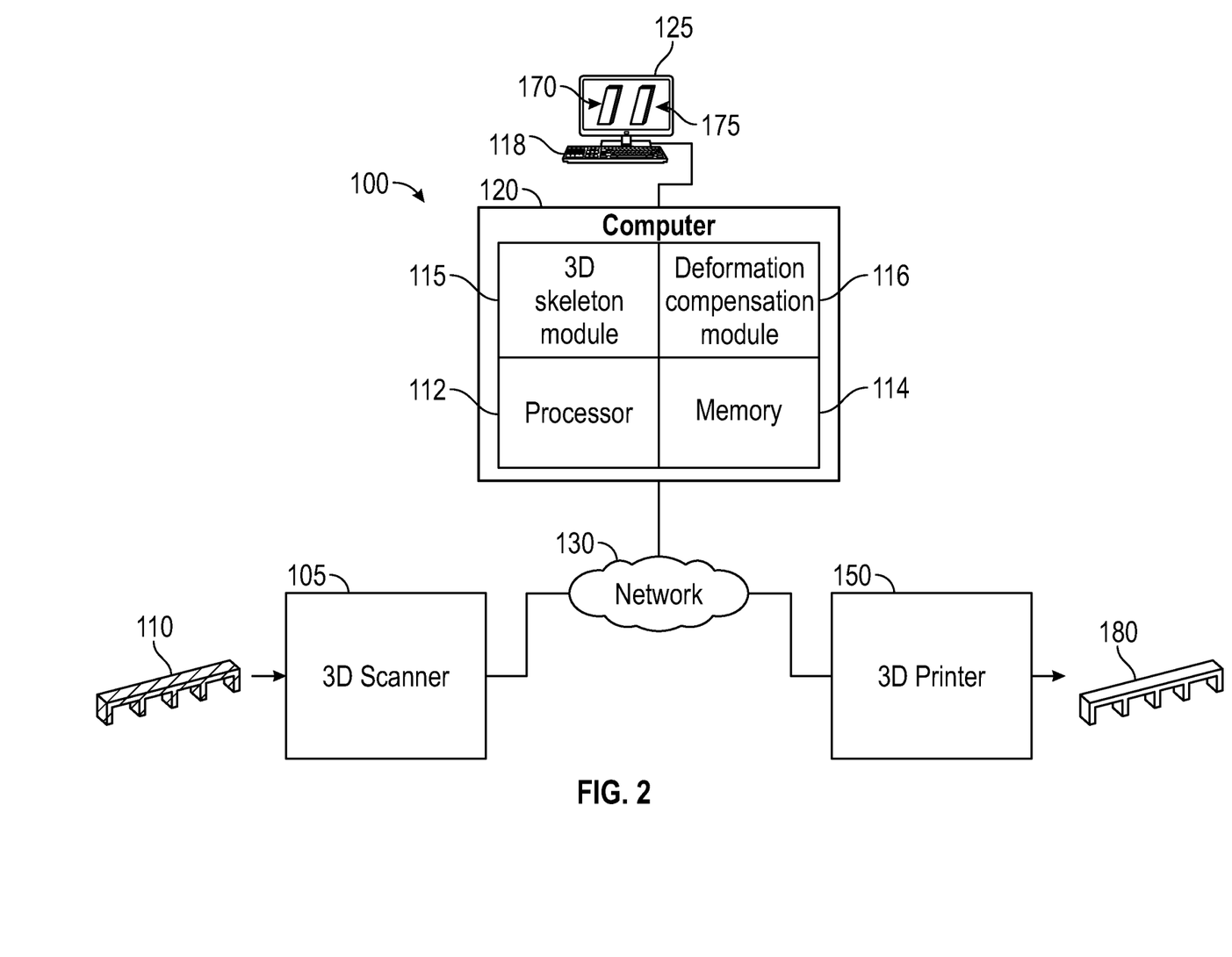
FIG. 2 is a block diagram of a computing system capable of performing an additive manufacturing process distortion compensation process according to a non-limiting embodiment.

Turning now to FIG. 2, an additive manufacturing system 100 is illustrated according to a non-limiting embodiment. The additive manufacturing system 100 is capable of performing an AM process to create a physical 3D product or object 180 based on an input digital model 170 which represents a physical target object 110. The input digital model 170 can be referred to as a digital nominal model 170. As shown in FIG. 2, the additive manufacturing system 100 includes a 3D scanner 105. The 3D scanner 105 is employed to capture visual representations of a physical object 110. The 3D scanner 105 can include cameras or sensors employed to generate dense point clouds or polygon meshes used in 3D modeling. Point clouds and meshes can also be obtained from commercial software platforms. The 3D scanner 105 can be implemented using technology including but not limited to: 3D digitizers; laser scanners; structured light scanners; laser pulsed scanners; white light scanners; (Light Detection And Ranging) LIDAR; digital cameras; and structured light 3D sensors and/or cameras. In one or more embodiments, the structured 3D sensors include "light coding" 3D depth acquisition sensors which codes working scene that includes a target object with near-IR light. The returned light is detected by the "light coding" 3D depth acquisition sensor, and the light distortions included in the returned light define a light coding indicate the location of the target object with respect to the working scene. A CMOS image sensor can be utilized to read the coded light back from the scene using various algorithms to triangulate and extract the 3D data.

In at least one non-limiting embodiment, the system 100 can be employed to perform 3D printing as an application of 3D scanning. For instance, a target working object 110 is scanned by 3D scanner 105 so as to generate scan data, including 2D visualizations (e.g., photographic images) and/or geometric measurements representing the physical surface of object 110. Object 110 can be a physical 3D article consisting of differing geometric shapes. The scan data can be transmitted from the 3D scanner 105 to an AM process distortion compensation computing system 120.

The AM process distortion compensation computing system 120 further includes a 3D skeleton module 115 and a deformation compensation module 116. The 3D skeleton module 115 processes the received scan data to generate a digital nominal model 170 of the scanned object 110, along with a skeletal model of the digital nominal model 170 and an input distortion model (not shown in FIG. 2). The digital nominal model 170 can be a computer-generated 3D model, for example a 3D model that can be modified using CAD software. The distortion model can be predetermined and obtained using a history of test results or monitoring several stages of a fabricated AM product over one or more previous fabrication runs (e.g., see FIG. 1).

The digital nominal model 170 can be further processed, using 3D Scan Processing Software stored in the memory 114, for example, to slice the digital nominal model 170 into several cross sections according to a predesignated thickness for each layer, so that an AM peripheral device 150 can construct each layer sequentially. In at least one embodiment, the AM peripheral device 150 includes, but is not limited to, a 3D printer 150. Each layer's construction can be analogous to printing of an image with a particular thickness, or volume. After performing a number of AM iterations by the AM peripheral device 150 (e.g., after all layers have been printed), a 3D AM built product 180 (e.g., printed product 180) can be produced having the same dimensions as the input model (e.g., digital nominal model 170). It should be appreciated that the embodiments can be used to realize other applications of 3D scanning techniques in addition to 3D printing, such as digital archiving, reverse engineering, manufacturing, and inspection. In addition, some embodiments employ 3D printing without any 3D scanning, such as when the digital nominal model 170 is built on the process distortion compensation computing system 120 using a 3D modelling program (e.g., CAD software). The AM peripheral device 150 implements 3D printing using specific techniques associated with 3D printing, for example Stereolithography (STL), also referred to as "SLA" or "SA".

The 3D scanner 105 is configured to implement various approaches to 3D scanning that are based on imaging principles. For example, 3D scanner 105 can employ photogrammetry and/or light-based 3D scanning techniques for generating a visual representation of object 110. In some implementations, the 3D scanner is employed to take multiple 2D pictures of object 110. The 2D images can be captured from various positions, representing different perspectives, around the object 105. According to some embodiments, the 3D scanner 105 includes one or more cameras arranged at various angles about the object 110. Different viewpoints/camera angles associated with the 2D images captured by 3D scanner 105 can be employed to construct a 3D digital model from the scan data. Thereafter, the various 2D images can be fused, or otherwise combined, so as to generate a 3D mesh of the object. In at least one embodiment, points from various point of views can be obtained, a bundle adjustment or other kind of 3D re-contracture methods is performed to obtain the 3D mode, and meshes are generated from the points.

In some implementations, the 3D scanner 105 is configured to transmit patterns of light, for example pulsed light, onto object 110. The edges of lines in the light pattern can be used to calculate a distance between the 3D scanner 105 and the surface of scanned object 110. Based on the deformations of the light patterns, a model form of the object can be determined and used to create a 3D mesh, or digital replica of object 110. Alternatively, 3D scanner 105 can include sensors used to measure various angles of reflected light laser which it can translate into coordinates of object 110 and therefore into a 3D mesh. In some implementations, the 3D scanner 105 scans object 105 using a laser, for example a laser line or a single laser point. According to such embodiments, 3D scanner 105 includes one or more sensors employed to detect the laser light that is reflected from object 110. Subsequently, the process distortion compensation computing system 120 can calculate a distance between object and the laser source of 3D scanner 105 using techniques such as triangulation. As a laser light from 3D scanner 105 is reflected from the scanned object 110, the 3D skeleton module 115 can be employed to calculate angles associated with the light detected by the sensors and, thereby determine various geometric measurements for the surface of object 110.

The process distortion compensation computing system 120 includes a processor 112 and a memory 114. The process distortion compensation computing system 120 can be connected to a computer network 130, which can be a private network, a public network, a virtual private network, etc. The computer network 130 can be implemented as either a wired network (e.g., Ethernet) or a wireless network. The various devices of system 100, including 3D scanner 105, process distortion compensation computing system 120, and the AM peripheral device 150 can be connected via network 130. Examples of computer networks include, but are not limited to, a local area network (LAN), a wide area network (WAN), and the Internet. As shown in FIG. 2, the computer network 130 is a wired network so that devices can communicate, or otherwise transmit, data via physical connections such as Universal Serial Bus (USB) connectors. In some implementations, computer network 130 can be a wireless local area network (WLAN), such as an IEEE 802.n network. Thus, 3D scanner 105 and the process distortion compensation computing system 120, for example, are communicatively coupled, and capable of wireless transmission of scan data via the computer network 130.

The processor 112 can be one or more hardware processors, which can each include multiple processor cores. The memory 114 can include both volatile and non-volatile memory, such as Random Access Memory (RAM) and Flash RAM. The process distortion compensation computing system 120 can include various types of computer storage media and devices, which can include the memory 114, to store instructions of programs that run on the processor 112.

The 3D skeleton module 115, which can operate locally on the process distortion compensation computing system 120, and present a user interface (UI) employed for displaying, or otherwise rendering, a 3D representation, such as digital nominal model 170 on a display device 125 of the process distortion compensation computing system 120. The display device 125 can be operated using one or more input devices 118 of the process distortion compensation computing system 120 (e.g., keyboard and mouse or touch screen). Note that while shown as separate devices in FIG. 2, the display device 125 and/or input devices 118 can also be integrated with each other and/or with the process distortion compensation computing system 120, such as in a tablet computer.

The 3D skeleton module 115 is programmed to analyze, process, and manipulate the scan data (e.g., 2D images, geometric measurements) associated with the scanned object 110, that is generated using scanning techniques employed by 3D scanner 105. The 3D skeleton module 115 can generate a 3D representation, such as digital nominal model 170 that is intended to correspond to the shape, size, and dimensions of the physical object 110. In some implementations, the 3D skeleton module 115 can employ known systems and techniques for generating a 3D representation from 2D images. Additionally, 3D skeleton module 115 can be configured to process and analyze immense amounts of geometric measurements representing the 2D and 3D spatial characteristics associated with object 110 captured using 3D scanner 105.

The 3D skeleton module 115 also generates a skeleton model of the nominal model 170 and the deformation model (i.e., deformed model of the nominal model 170). A rigid 3D model is usually composed of a number of "part"—defined as a "skeleton" in computer graphic—to represent the 3D model in terms of an abstract geometrical and topological presentation of the 3D shape. The skeleton is utilized to capture shape deformation during various AM states. In at least one embodiment, the shape deformation analysis is implemented using a dual-operation strategy: (i) points on the surface of the skeleton model are determined; and (ii) points inside the skeleton model are derived. The inside points are coupled to the surface points, and therefore their position is function of the location of the surface points. The deformation of the skeleton model can then be determined by relocating the surface points, while the inside points are in turn readjusted. Accordingly, the shape and the volume of the skeletal model can be deformed to take into account deformations the target AM product is expected to experience during an actual AM fabrication process. This resulting deformed skeleton model can then be utilized by the deformation compensation model to generate a compensation model that compensates for these expected deformations.

The deformation compensation module 116 can be programmed to implement a deviation representation (e.g., a digital distortion model), modeling, prediction, and compensation techniques for AM accuracy according to the embodiments. In an implementation, the deformation compensation module 116 can be utilized to initiate, and otherwise perform, one or more trials on standard calibration parts using the AM peripheral device 150. In an implementation, the trials use one or more standard calibration parts of known test objects, where the geometric properties corresponding to the standard calibration parts are known. For example, the objects used during the trials can have standard shapes related to 3D modeling, such as cylinders. Based on the trials, a shape deviation (e.g., 2D and/or 3D) can be determined after the object 110 has been manufactured into a corresponding AM built product 180 using the AM techniques of the embodiments. Thus, any shape deviations, or discrepancies, from comparing the corresponding known points of the object's 110 surface geometry and the resulting AM built product 180 can be determined.

According to various non-limiting embodiments, the shape deviations measured in the trials can be an indication of the inaccuracy of characteristics of the product material, and thereby can represent a deformation error between the target working object 110 and the intended 3D AM fabricated product 180. Moreover, the trial can be employed as a calibration technique for the deformation compensation module 116, for example, that can be further utilized during 3D scan data processing. For instance, the deformation compensation module 116 can employ information obtained during trials to predict deformation errors that may result in the fabricated 3D AM product 180, and perform compensation actions (e.g., adjust a digital compensation model) to correct any geometric errors in the digital models generated from 3D scanning Thus, the embodiments may realize AM techniques that can control and increase accuracy of the design and/or creation of AM products.

In at least one embodiment, the deformation compensation module 116 continuously adjusts or updates the compensation model over several iterations. Following each iteration, the deformation compensation module 116 compares the compensation model to a deviation threshold. The deviation threshold is based on the dimensions and volume of the nominal model. Following each iteration, the deformation compensation module 116 may adjust the deformed skeletal model. For example, the compensation module 116 may slightly enlarging or shrinking its volume, as well as predict the amount of volume and shape configure changes before and after compensation. When the updated deformation compensation model satisfies the deviation threshold following an iteration, the current compensation model is output and can be used to fabricate a target 3D AM product 180 that excludes the predicted shape and/or volume deformations.

Figure 3:
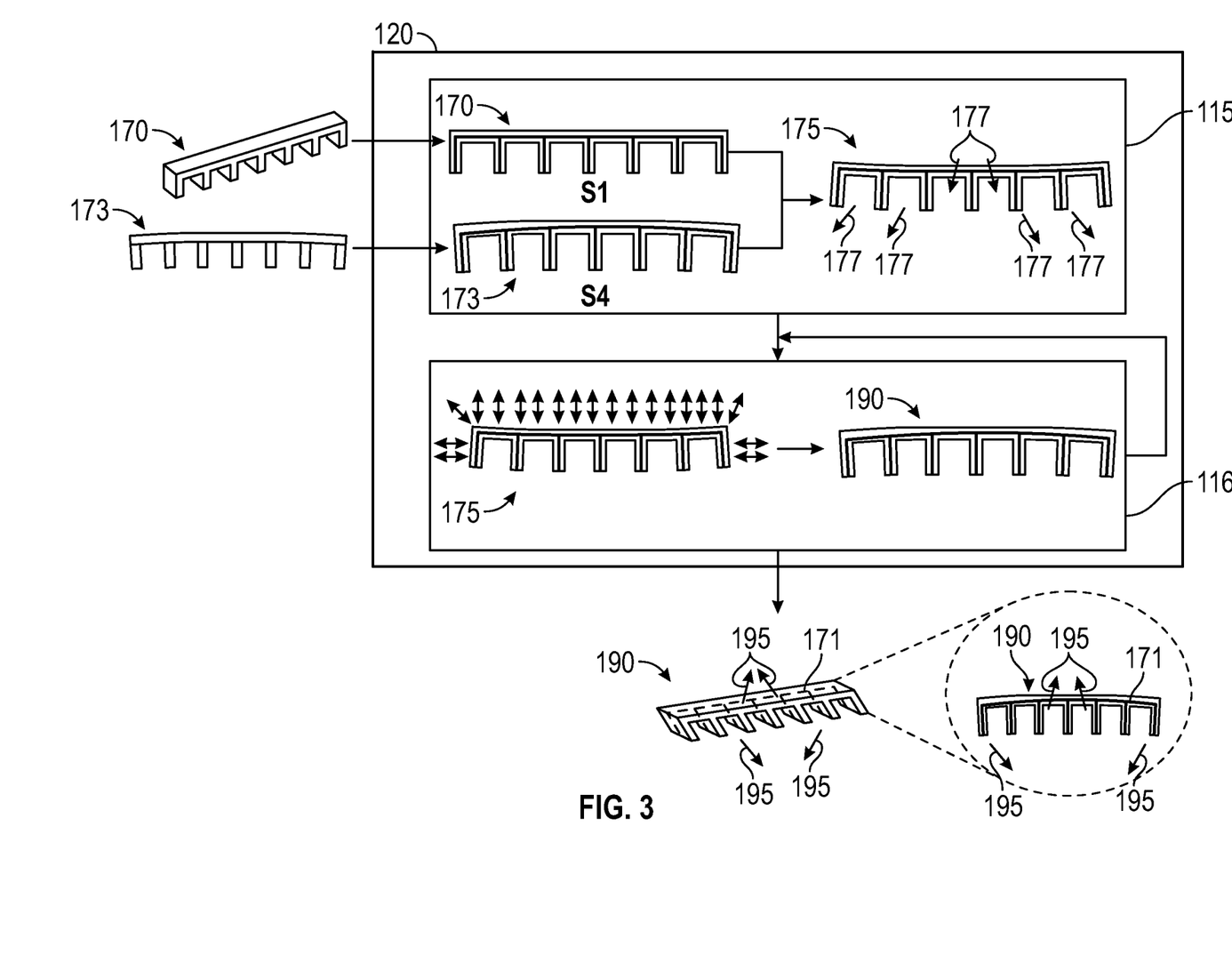
FIG. 3 is a block diagram of a 3D Scan Processing module included in an additive manufacturing process distortion compensation system according to a non-limiting embodiment.

Turning now to FIG. 3, the 3D skeleton module 115 and the deformation compensation module 116 are described in greater detail. In at least one embodiment, the 3D skeleton module 115 receives both a digital nominal model 170 that represents a physical target object excluding distortions (i.e., having ideal dimensions), and a digital distortion model 173 that represents the physical target object including one or more expected distortions, e.g., distortions caused by springback. The 3D skeleton module 115 generates a nominal skeleton model 170 of the nominal model and a distorted skeleton model 173 of the distortion model. Based on a comparison between the nominal skeleton model 170 and the distorted skeleton model 173, the 3D skeleton module 115 generates a compensated skeleton model 175. The compensated skeleton model includes one or more predicted distortions 177 representing the predicted changes in volume and/or shape the 3D AM product is expected to undergo during actual fabrication.

Figure 4:
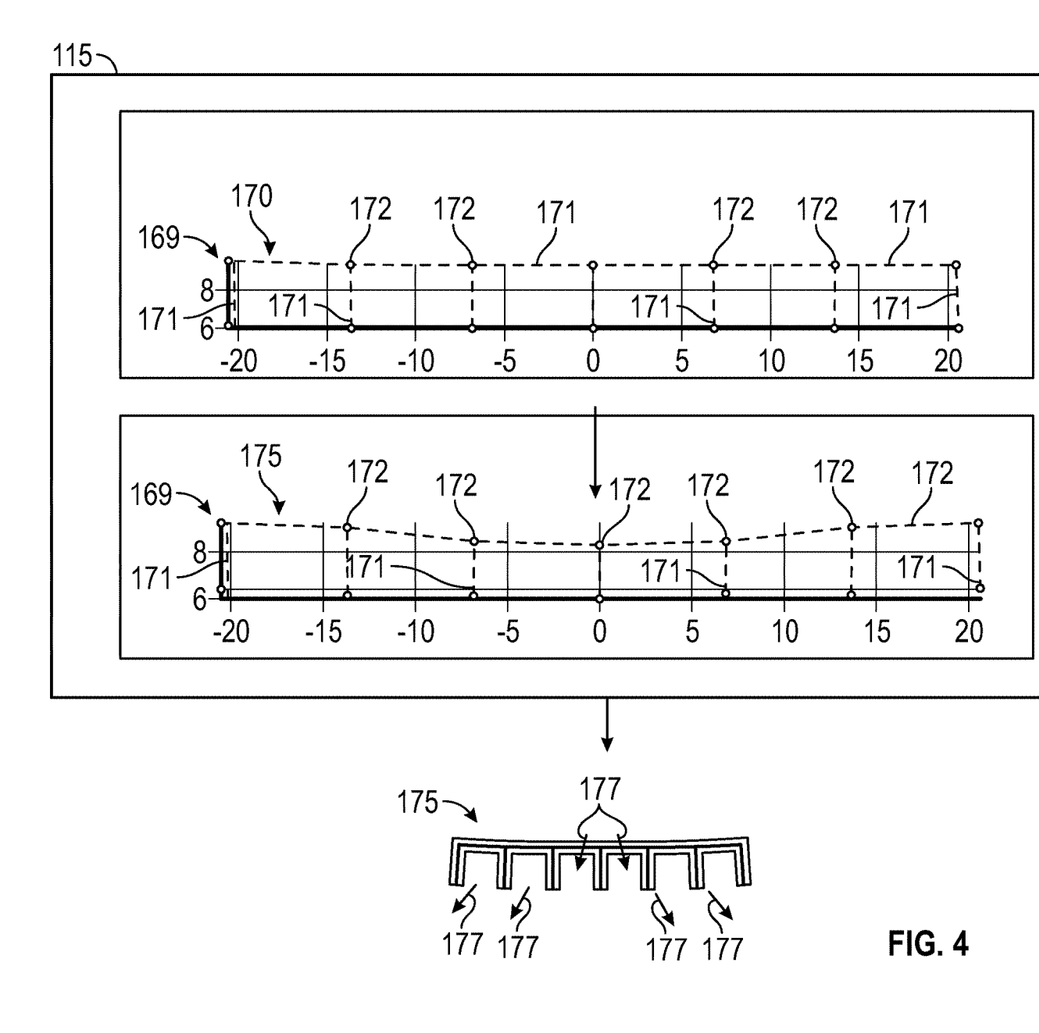
FIG. 4 illustrates generation of a compensated skeleton model according to a non-limiting embodiment.

The compensated skeleton model 175 is illustrated in greater detail in FIG. 4. For example, the 3D skeleton module 115 generates the compensated skeleton model 175 by generating a skeleton 169 having segments 171 and joints 172 matching the nominal skeleton model 170. The skeleton 169 is then utilized to generate a skeleton compensation model 175. In at least one embodiment, the compensated skeleton model 175 can be generated by deforming the skeleton 169 of the nominal model 170. For example, comparing the distorted skeleton 173 to the nominal skeleton 170, a compensation skeleton model 175 can be generated that compensates for the springback distortion illustrated in FIG. 1 (e.g., stage 4). Secondly, volume changes could be obtained by coupling internal points to surface points, and moving the surface points on the model surface such that the internal points are adjusted. This adjustment technique using internal surface points is described in greater detail below.

With reference again to FIG. 3, the deformation compensation module 116 receives the compensated skeleton model 175, and performs one or more iterations to determine a compensation model 190 that when utilized results in fabrication of a target 3D AM part which excludes the expected deformations indicated by the digital distortion model 173. By utilizing the compensated skeleton model 175, the deformation compensation module 116 can identify outer surface points and adjust the outer surface toward the surface's normal direction, while shape configuration changes according to deformation of the skeletal segments 171 and joints 172. By taking the advantage of that property, shape deformation could be estimated and distortion compensation is achieved over multiple iterations. For example, during each iteration, the compensation model 190 can be adjusted to include compensation distortions or opposing distortions 195 which will compensate for the predicted distortions 177. The updated compensation model is feedback for analysis until the predicted distortions fall below a threshold. The compensation model 190 can then be output and used to fabricate the target 3D product, with confidence that the expected deviations indicated in the digital distortion model 173 will be eliminated.

In addition, internal points of the skeletal model along with its surface points can be determined. The internal points are coupled to the surface points such that their adjustment is a dependent on the modified location of the surface points. For example, the internal points can be adjusted by morphing in response to changes in the location of the surface points. In at least one embodiment, morphing of the internal points is achieved using the widely Radial Basis Function (RBF) morphing. It should appreciated, however, that other morphing methods are can be used without departing form the scope of the invention. In this manner, not only is the shape of the skeletal model taken into account, so is its volume.

Figure 5:
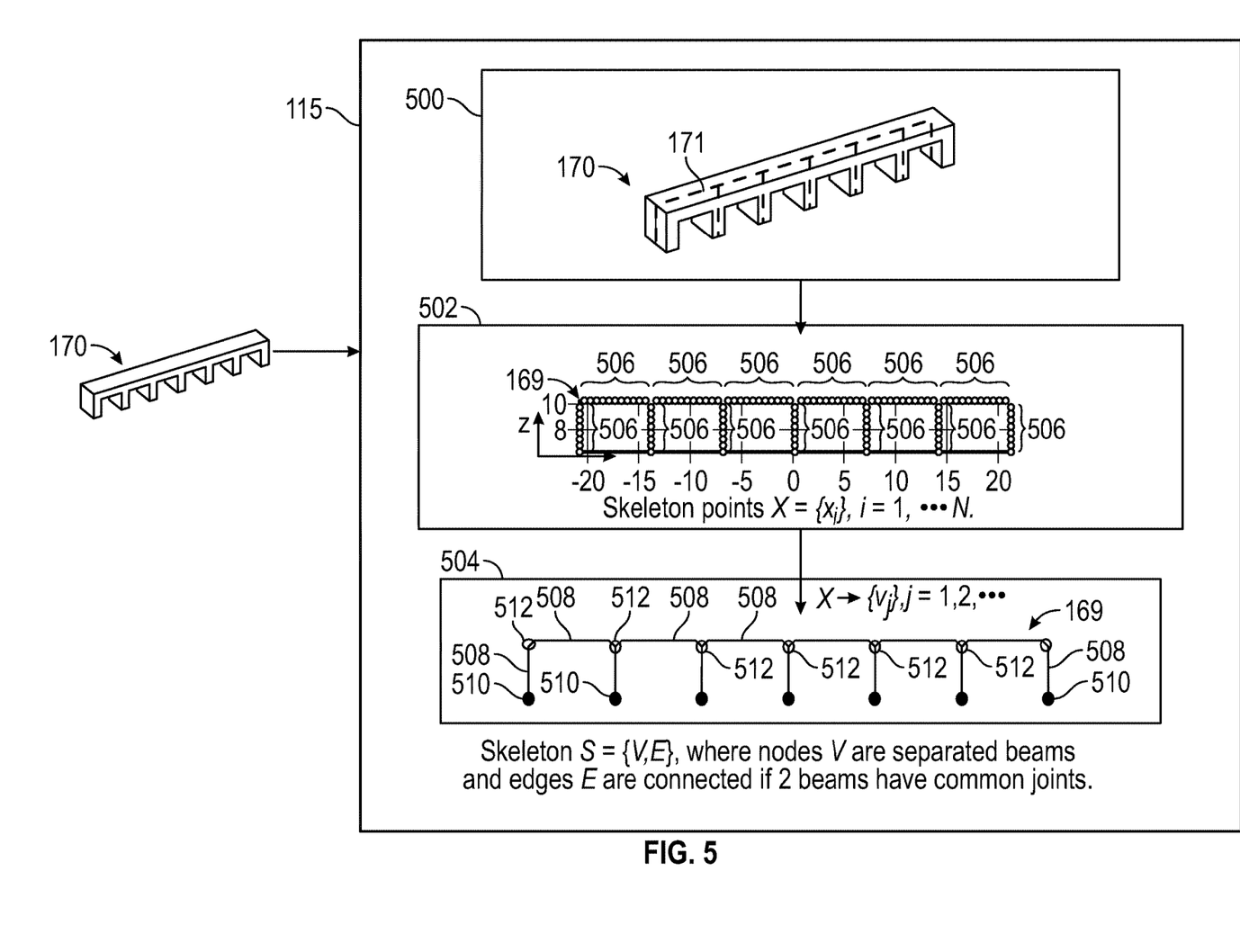
FIG. 5 illustrates a 3D skeleton module according to a non-limiting embodiment.

Turning to FIG. 5, the 3D skeleton module 115 is illustrated in greater detail according to a non-limiting embodiment. The 3D skeleton module 115 includes a scanning unit 500, a skeleton point generator 502, and a skeleton beam generator 504. The scanning unit 500 receives a digital model (e.g., nominal model 170) applies pairwise surface and node positions to various scanning strategies to detect points that only hit an even number of times.

The skeleton point generator 502 identifies the "hit" points as skeletal points 506. The skeletal points 506 can be defined as X={x_i}, i=1, . . . N, where X is an individual skeletal point. Accordingly, a multitude of identified points define an initial skeleton 169. As described herein, a skeleton is an abstract geometrical and topological presentation of the 3D shape. In at least one embodiment, the method is defined as centroid points of a closed rigid 3D model. The centroid points therefore can be efficiently and effectively calculated during surface point extraction. The result will be used to estimate shape deformation.

The initial skeleton 169 is output to the skeleton beam generator 504. The skeleton beam generator 504 skeletal points 506, and can separate the skeleton points into different segmentations or individual beams 508. In addition, the skeleton beam generator 504 identifies nodes 510, which separate each individual beam 508. The skeleton beam generator 504 also identifies edges 512 as nodes which connect the beams 508 at a common joint.

Figure 6:
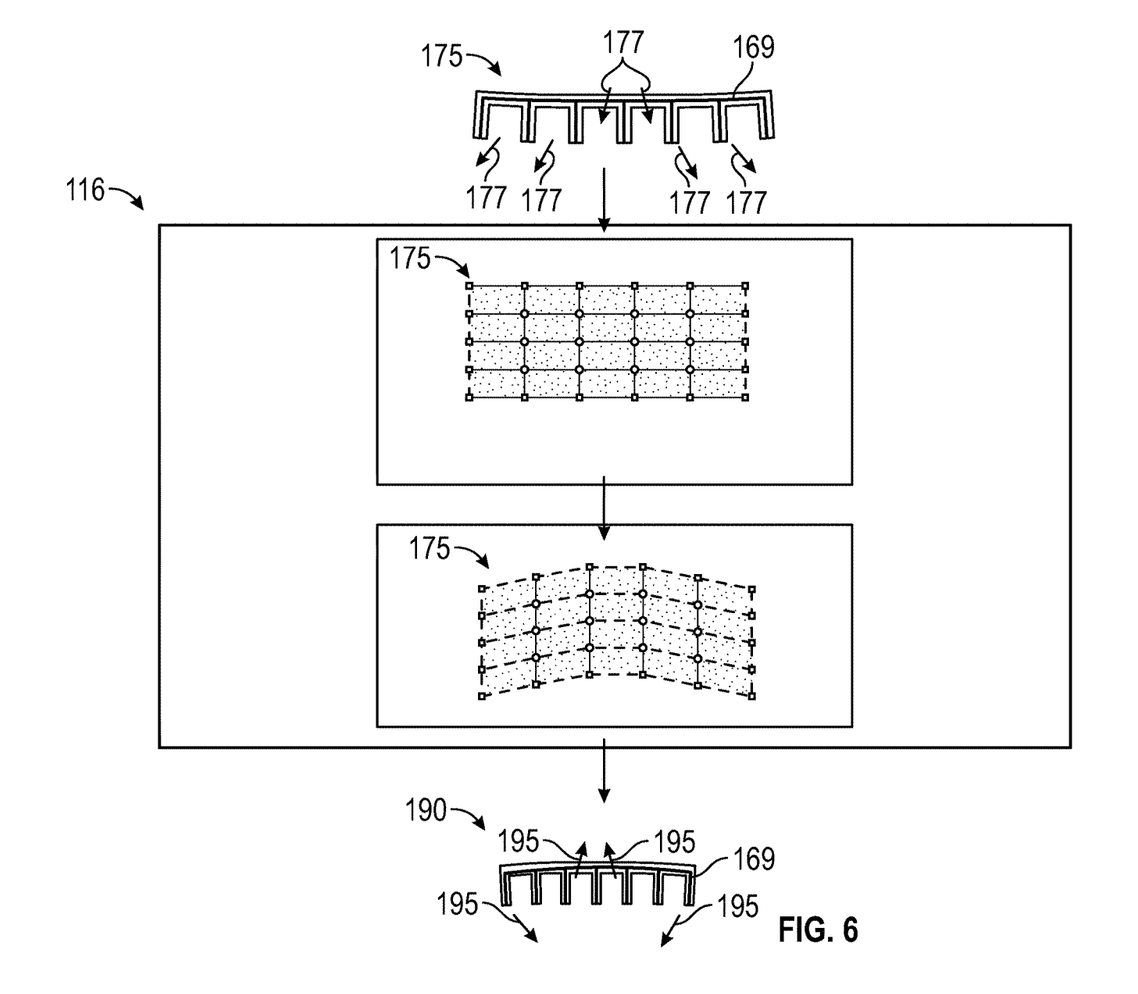
FIG. 6 illustrates a deformation compensation module according to a non-limiting embodiment.
Figure 7:
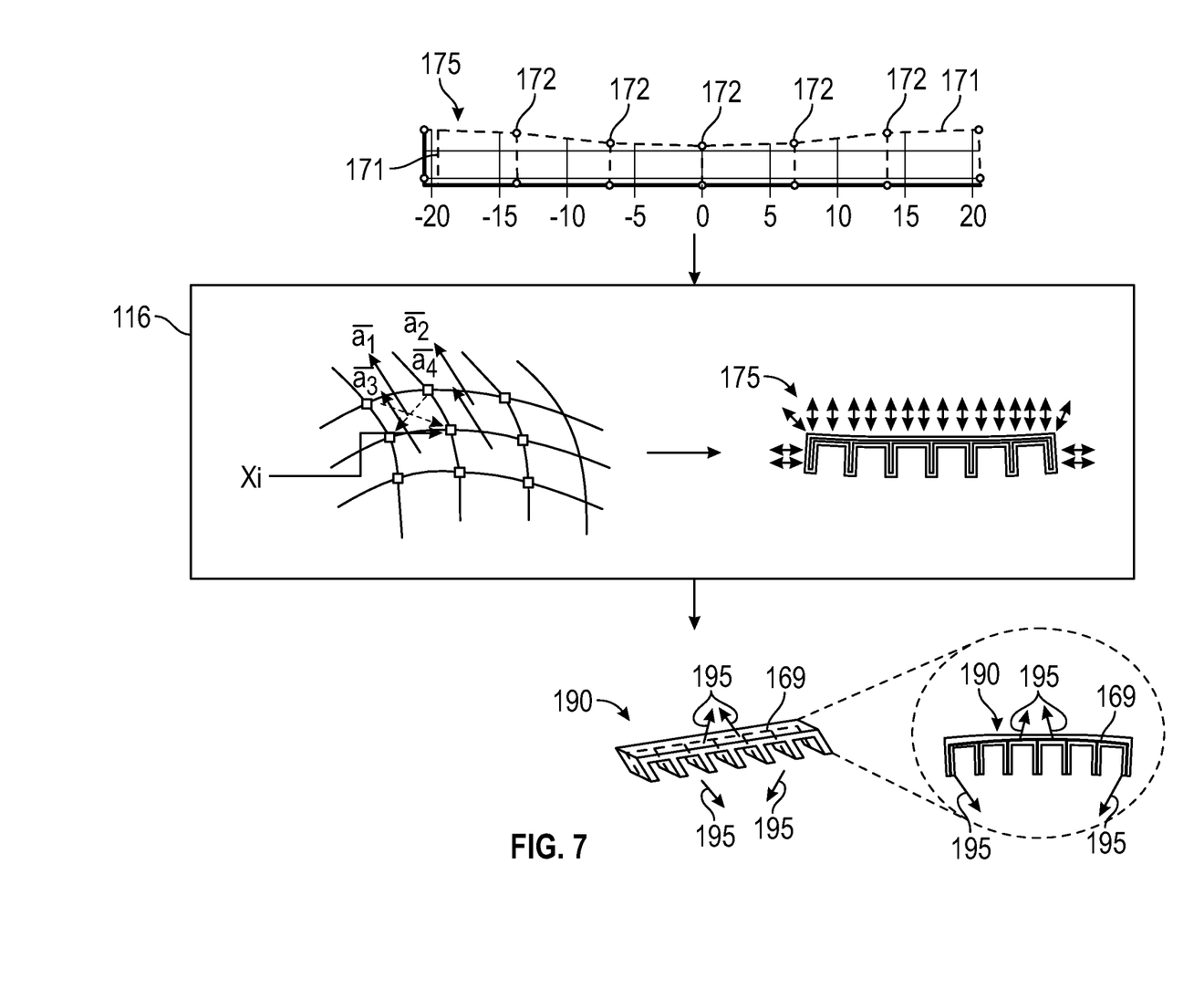
FIG. 7 illustrates node movement in a compensating AM iteration process according to a non-limiting embodiment.

Referring to FIG. 6, the deformation compensation module 116 is illustrated in greater detail according to a non-limiting embodiment. The deformation compensation module 116 receives the compensated skeleton model 175, and performs a fast surface norm vector estimation that distorts the compensated skeleton model 175 to generate the compensation model 190 used for fabricating the target 3D AM product. For a given set of discrete surface points Xsur∈X, Xsss=·xj·, j=1, . . . M, the deformation compensation module 116 performs a fast estimation method to obtain the norm vector from interpolations. As illustrated in FIG. 6, the norm vector located at point $x_i$ is the average of its neighboring 4 grids' norm vectors: $a_1$, $a_2$, $a_3$ and $a_4$, which can be efficiently estimated from the cross product of gird corners. In at least one embodiment, the compensation applied to the skeletal compensation model 175 is applied to shape deformation and volume change on the surface points. Therefore, only the surface points Xsur∈X, Xsur={xj}, j=1, . . . M need to move, while spatial layout of the 3D points inside the model (i.e., internal points) is adjusted accordingly. Intuitively, RBF morphing method, for example, is able to merge the displacement and keep the contour—surface points—unchanged, as illustrated in FIG. 7. In this manner, the skeleton results can be utilized to determine shape deformation, while volume change can be controlled by normal vector changes.

Figure 8:
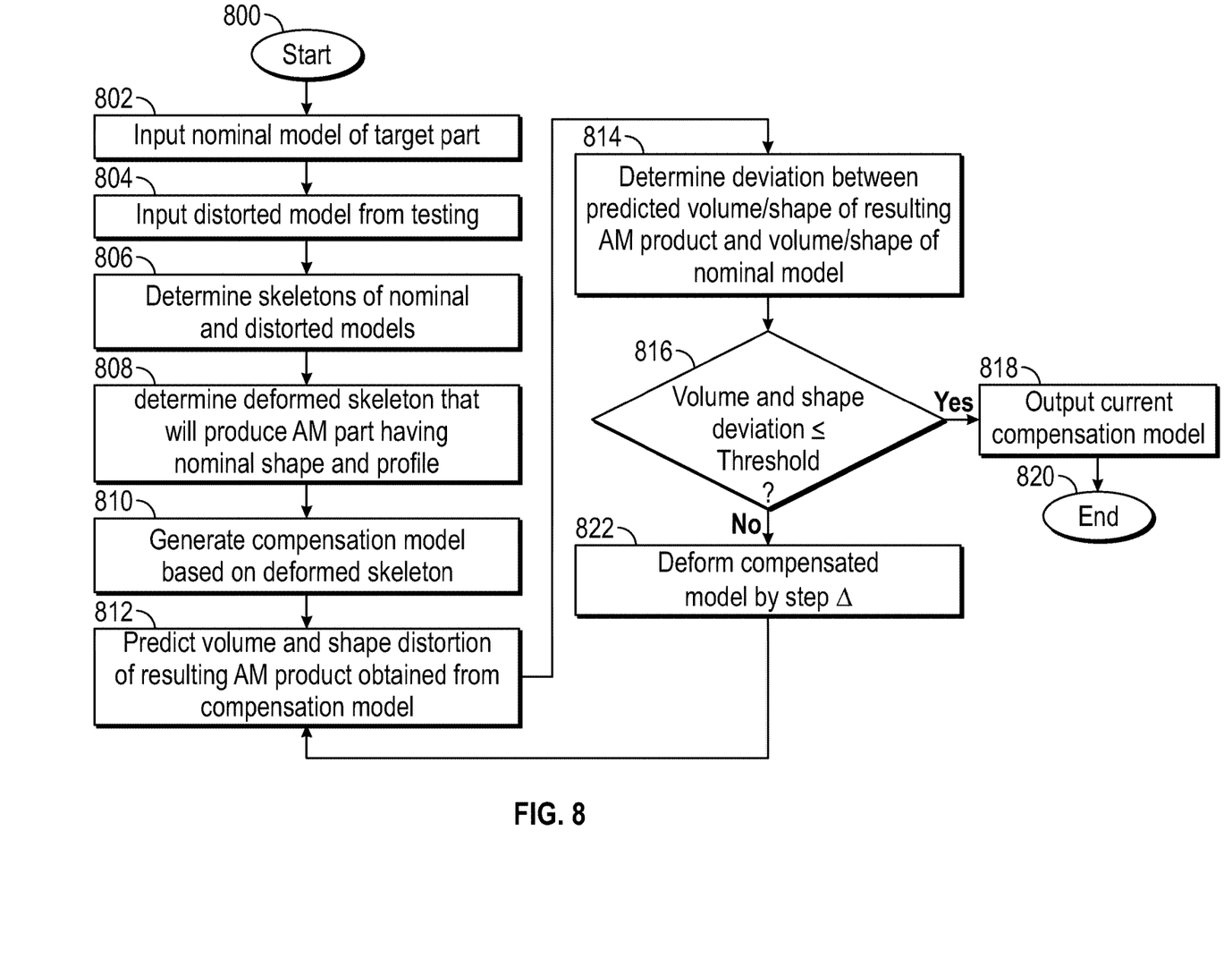
FIG. 8 is a flow diagram illustrating a method of fabricating a physical three-dimensional (3D) product according to a non-limiting embodiment.

Referring now to FIG. 8, a flow diagram illustrates a method of fabricating a physical three-dimensional (3D) product according to a non-limiting embodiment. The method starts at operation 800, and at operation 802 a nominal model of a target part to be produced using an AM fabrication process is input to an AM fabrication system. At operation 804, a distorted model of a target part is input to the AM fabrication system. The distorted model can be predetermined and obtained using a history of test results or monitoring several stages of a fabricated AM product over one or more previous fabrication runs (e.g., see FIG. 1). At operation 806, a skeleton of the nominal model and a skeleton of the distorted model are determined. The skeleton can be determined by comparing the nominal model to the deformations in the target AM product during various stages of a previous fabrication run. At operation 808, a deformed skeleton model to be used to produce the target AM product is generated. The deformed skeleton model can be determined by calculating differences in the volume and shape features (e.g., edges, corners, planar alignments, etc.).

At operation 810, a compensation model which aims to compensate for deformations in volume and shape of the resulting target AM product is generated based on the deformed skeleton model. At operation 812, volume and shape distortions of the resulting AM product are predicted using the compensation model. The predicted volume and shape distortions can be determined by adjusting the skeleton model along normal vectors (e.g., surface vectors) and then predicting the volume shrinkage based on the adjusted skeleton model. Shape prediction can be determined based on the changed shape of the skeleton model. Deviation(s) between the predicted volume and shape of the resulting AM product, and the volume and shape of the nominal model are determined at operation 814. The deviation(s) can be determined, for example, by (i) aligning (along one or more planes or axes) the dimensions of the nominal part with the dimensions of the compensated model, (ii) calculating a volume differential between the nominal model and the compensated model, and/or (iii) comparing particular features (e.g., corners, edges, angles, etc.) between the nominal model and the compensated model. At operation 816, the determined deviation(s) is compared to a deviation threshold. The deviation threshold may include, for example, differences between points or nodes on the nominal model and points or nodes on the predicted resulting AM product.

When deviation(s) are less than or equal to the deviation threshold, the current compensation model is output at operation 818, and the method ends at operation 820. When, however, the deviation(s) exceed the deviation threshold, the compensation model is updated by further deformed or adjusted by a predetermined incremental step ($\Delta_{V/S}$) to generate an updated compensation model at operation 822. The method returns to operation 812 where the volume and shape distortion is again predicted. At this stage, however, the volume and shape distortion is predicted using the updated compensation model. The method ultimately returns to operation 816 to compare the changed deviations to the deviation threshold. If the deviation(s) still exceed the deviation threshold, the method returns to operation 812 and continues to adjust the compensation model. If, however, the deviation(s) are now less than or equal to the deviation threshold, the current compensation model is output at operation 818, and the method ends at operation 820.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, the term "module" or "unit" can refer to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufacturing (AM) system comprising:
   a process distortion compensation computing system configured to determine a digital nominal model that represents a physical target object excluding a distortion, and a digital distortion model that represents the physical target object including at least one distortion; and
   an AM peripheral device configured to form a three-dimensional (3D) physical object based on a digital compensation model, wherein the process distortion compensation computing system determines a digital skeletal model indicating a predicted change in at least one of the shape and volume of the nominal model, and generates the digital compensation model based on the skeletal model that compensates for the at least one distortion, the process distortion compensation module comprising a 3D skeleton module that generates the digital skeletal model based on the digital nominal model and the digital distortion model, wherein the 3D skeleton module comprises:
- a scanning unit that determines surface points of the 3D nominal model, the surface points connected to a plurality of internal points of the 3D nominal model;
- a skeleton point generator that determines a plurality of individual skeletal points defining an initial skeleton of the 3D nominal model based on the surface points and the internal points; and
- a skeleton beam generator that separates the plurality of skeletal points into a plurality of individual beams separated by one another by a node, and wherein the process distortion compensation module determines surface points of the digital skeletal model based on the surface points of the 3D nominal model, and compensates for the predicted change by applying a morphing process to the digital skeletal model that compensates a shape deformation and volume change of the surface points, whereby the compensate shape deformation and volume change of the surface points of the digital skeletal model adjusts a spatial layout of the internal points so as to compensate for the at least one distortion.

2. The AM system of claim 1, wherein the process distortion compensation computing system comprises:
a deformation compensation module that modifies the digital skeletal model over a series of iterations to generate an updated digital compensation model.

3. The AM system of claim 2, wherein after completing an individual iteration the deformation compensation module outputs the updated digital compensation model based on a comparison between the digital nominal model and the updated modified compensation model.

4. The AM system of claim 2, wherein the deformation compensation model generates a deviation threshold based on the digital nominal model, and outputs the updated compensation model when deviations in the updated compensation model are less than or equal to the deviation threshold.

5. A method of fabricating a physical three-dimensional (3D) product using an additive manufacturing (AM) system, the method comprising:
determining, via a process distortion compensation computing system, a digital nominal model that represents a physical target object excluding a distortion;
digitally representing, via a digital distortion model, the physical target object including at least one distortion;
determining, via the process distortion compensation computing system, a digital skeletal model indicating a predicted change in at least one of the shape and volume of the nominal model;
generating, via the process distortion compensation computing system, a digital compensation model based on the skeletal model that compensates for the at least one distortion; and
forming, via an AM peripheral device, a three-dimensional (3D) physical object based on the digital compensation model, wherein generating the digital skeletal model further comprises:
- determining, via a scanning unit, surface points of a 3D nominal model, the surface points connected to a plurality of internal points of the 3D nominal model;
- determining, via a skeleton point generator, a plurality of individual skeletal points defining an initial skeleton based on the surface points;
- separating, via a skeleton beam generator, the plurality of skeletal points into a plurality of individual segments separated by one another by a node;
- determining surface points of the digital skeletal model based on the surface points of the 3D nominal model;
- applying, via the process distortion compensation module, a morphing process to the digital skeletal model that compensates a shape deformation and volume change of the surface points, whereby the compensate shape deformation and volume change of the surface points of the digital skeletal model adjusts a spatial layout of the internal points so as to compensate for the at least one distortion.

6. The method of claim 5, wherein generating the skeletal model comprises:
generating, via a 3D skeleton module, the digital nominal model and the digital distortion model; and
modifying, via a deformation compensation module, the digital skeletal model over a series of iterations to generate an updated digital compensation model.

7. The method of claim 6, further comprising after completing an individual iteration, outputting the updated digital compensation model based on a comparison between the digital nominal model and the updated modified compensation model.

8. The method of claim 6, further comprising generating, via the deformation compensation model, a deviation threshold based on the digital nominal model, and outputs the updated compensation model when deviations in the updated compensation model are less than or equal to the deviation threshold.

9. The method of claim 5, wherein adjusting a position of the surface points of the digital skeletal model in response to performing the morphing process adjusts a position of the internal points included in the digital skeletal model so as to compensate for the predicted change in the volume of the nominal model.

* * * * *